Sept. 15, 1959    L. G. NANNINI    2,903,876
FURNACE OR REACTOR
Filed Jan. 24, 1955

INVENTOR.
L. G. NANNINI
BY *Hudson & Young*

ATTORNEY

2,903,876
Patented Sept. 15, 1959

2,903,876

FURNACE OR REACTOR

Louis G. Nannini, Henderson, Nev., assignor to Phillips Petroleum Company, a corporation of Delaware Application January 24, 1955, Serial No. 483,692

5 Claims. (Cl. 72—14)

This invention relates to an improved furnace or reactor construction and to a method of constructing a furnace or reactor.

Furnaces and reactors used for high temperature reactions are generally constructed with a precast refractory hollow cylindrical liner disposed axially in a generally cylindrical metal shell with a thick layer of castable refractory insulation substantially filling the annular space between the liner and the metal shell. In constructing large furnaces or reactors it is impractical to utilize a one piece construction for either the refractory liner of the furnace or the refractory insulating material surrounding the lining and therefore these members are built up in sections in the manner of brickwork utilizing suitable refractory cement between the section of refractory material. In prolonged high temperature use, gas leaks usually develop which can be detected by hot spots on the metal casing of the furnace. This defect in a furnace or reactor requires repair and in many instances the entire furnace has to be torn down and rebuilt, while in others a whole section of the furnace must be removed and rebuilt or replaced. In the usual procedure, the castable material is broken up during removal and cannot be reused. This repair work is not only expensive but is time consuming, thereby taking the reactor or furnace off-stream for extended periods with substantial economic loss from lessened production. The most time-consuming factor involved in this type of repair of furnaces and reactors is in the curing of the castable refractory material which must be freshly cast when the repair is made.

The principal object of the invention is to provide a reactor or furnace of improved construction and a method of constructing such a furnace which facilitates rapid repair of the furnace and permits immediate use of the furnace without waiting for the curing of freshly cast refractory material. Another object of the invention is to provide an improved method of constructing a furnace or reactor in sections. A further object is to provide a furnace or reactor which can be taken down in sections without impairing the castable refractory intermediate the liner and shell. Other objects of the invention will become apparent from a consideration of the accompanying disclosure.

Figure 1:
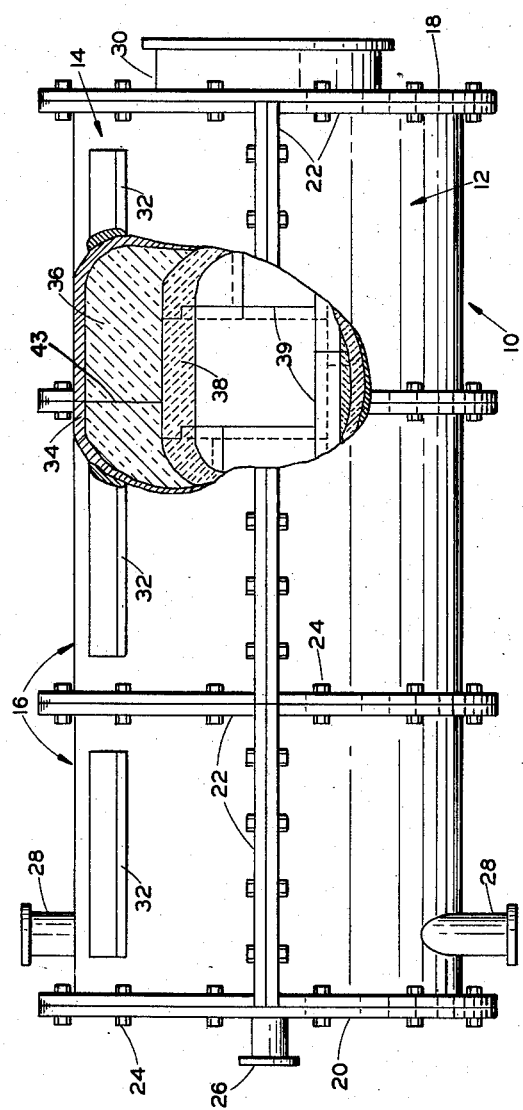
Figure 2:
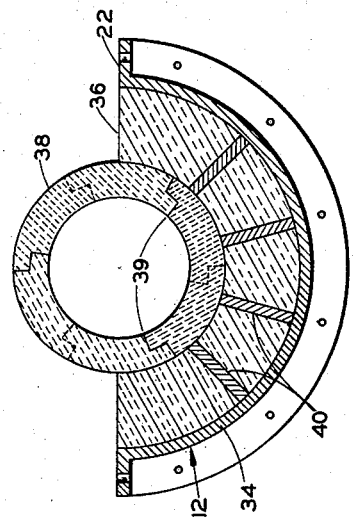
Figure 3:
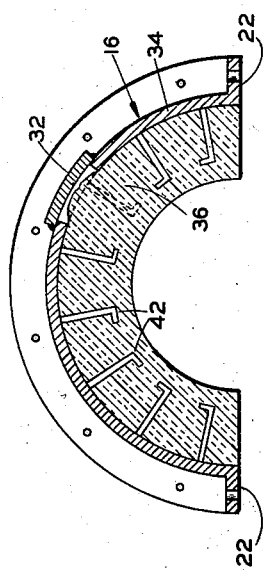

A reactor or furnace built in accordance with the invention comprises two longitudinal sections which, when fitted together, form an elongated cylindrical furnace or reactor having an axial combustion and/or reaction space. The upper longitudinal section is divided into a plurality of transverse or vertical sections which attach to each other and to the lower longitudinal section by suitable means, such as bolted flanges. The castable refractory insulating material is cast in the shell and permanently affixed thereto, particularly in the upper vertical sections, so that when these sections are removed for repair of the furnace lining the castable refractory material is removed intact with the shell, instead of having to be broken out and destroyed, as is the practice in repairing conventional furnaces and reactors. In this manner needed repairs to the inner lining of the furnace can be quickly made and no time is required for curing the refractories. Of course, non-vitrifying cement and asbestos gaskets or other suitable gasket materials are utilized in assembling the furnace to render same gas tight. Non-vitrifying cements are available from various manufacturers of refractories for cements for building furnaces. One such cement is No. 678 cement supplied by Johns-Manville Corporation. This is hydraulic setting semi-refractory finishing cement which withstands temperatures up to about 1900° F. without bonding to the refractory material with which it is in contact. A more complete understanding of the invention may be had from a consideration of the drawing of which Figure 1 is an elevational view of a furnace or reactor made in accordance with the invention, showing a cut-away section; Figure 2 is a transverse section of the lower section of the furnace of Figure 1; and Figure 3 is a transverse section of one of the vertical upper sections of the furnace of Figure 1.

Referring to Figure 1, a furnace 10 comprises a lower longitudinal section in the form of a half-cylinder 12 and an upper longitudinal section 14 constructed of a plurality of transverse or vertical sections 16. These sections of the furnace or reactor are attached to each other and to end plates plates 18 and 20 by means of flanges 22 and bolts 24. An axial gas inlet 26 and tangential gas inlets 28 serve to introduce fuel and air or other fluid reactants to the furnace. An axial effluent line 30 is provided at the opposite end of the furnace. Elements 32 in vertical sections 16 are cover plates for openings in the shell thru which castable insulating material is introduced when one of the methods of constructing the furnace disclosed herein is utilized and are also used for venting moisture and volatilized materials from the castable refractory material during curing. Openings (not shown) may be provided thru the shell and refractories near the effluent end of the furnace for quench lines to provide liquid (water) quenching of the hot effluent.

The cut-away section in furnace 10 shows the metal shell 34, castable insulating and refractory material 36, and precast refractory liner 38. The built-up construction of the precast refractory liner can be seen in this cut-away view. Joints 39 are lapped and are sealed with a commercial heat set mortar of lesser strength than the precast sections of element 38 so as to permit removal of these sections without breakage of same and to allow separation of the joints under stress of expansion and contraction.

Figure 2 shows the lower section 12 of the furnace with precast liner 38 in position on supports 40 which comprise elongated metal rods or ceramic spacers disposed on metal shell 34 in spaced-apart relation prior to casting of castable insulating material 36. When using metal supports, the same are inserted thru holes in shell 34 (not shown) and are withdrawn from the structure after the castable refractory is partially set and the resulting voids in the refractory are filled with refractory material. Supports 40 extend radially inwardly to the precast liner 38 when the same is placed axially in position in the lower furnace section. When supports 40 are ceramic, they are simply held in place in any suitable manner, such as by cement, until refractory 36 is cast and are left in the structure. After precast liner 38 is properly positioned axially within section 12 on supports 40, refractory material 36 is introduced in the form of a plastic mass, thick slurry, or mortar to the space between member 38 and shell 34 so as to fill this space to the level of the upper surface of flanges 22. In this manner precast liner 38 serves as a form for castable insulating material 36 in section 12.

Figure 3 shows one of the top vertical sections 16 before placing same on lower section 12 of Figures 1 and 2. In accordance with one method of construction, a series of anchor bolts 42 are suitably spaced apart and fastened to shell 34 to provide anchoring means for castable insulating material 36. The insulating material is then introduced to the shell section and the inner surface thereof is molded to fit precast liner 38 when section 16 is placed in position over the liner and bolted together at flanges 22. In this method of construction, a suitable cylindrical form is used to mold the inner surface of cast material 36 in the form of a half-cylinder the inner diameter of which is the same as the outside diameter of precast liner 38. A small space is provided between liner 38 and castable refractory 36 so that a thin layer of non-vitrifying cement may be used between liner 38 and castable refractory 36 when assembling the furnace.

Another embodiment of the method of the invention comprises constructing the lower longitudinal section of the furnace with the precast liner 38 in place on castable insulation 36, as described in connection to Figure 2, and thereafter fastening the individual shell sections 16 together in proper position on the lower longitudinal section 12. Castable refractory insulating material is then introduced thru one or more openings (under 32) in the top of each vertical shell section so as to fill up the space between the metal shell and precast liner 38, thereby completing the construction of the furnace. When utilizing this method, it is desirable to place a thin layer of separating material between each joint in the shell and extending radially inwardly to the refractory liner in order to facilitate removal of the various vertical sections of the shell and castable refractory without damaging the adjacent sections. Thin sheet metal can be utilized for separators between sections and its thickness may be adjusted to the thickness of the asbestos gasket to be utilized as a seal and cushion between flanges when the reactor is assembled prior to use. A limited space between the various sections of castable material and liner 38 is provided by any suitable spacing material, such as oiled paper, and this space which the oiled paper provides is filled with non-vitrifying cement when the furnace is re-assembled, thereby forming a more extensive gas tight seal 43 between the various sections and more resistance to flow of hot gas thru these joints.

Another embodiment of the invention comprises casting and anchoring refractory material on all of the shell sections to occupy only a portion of the annular space between shell sections 16 and 12 and liner 38, such as about one-half of this space, and thereafter filling the remaining space with similar or the same castable refractory mix, with liner 38 axially in place supported on refractory or ceramic bricks. These supports may be provided with holes which serve as channels for refractory mix to pass thru during casting. The outside surface of inner liner 38 and the inner surface of precast and anchored refractory material are coated with non-vitrifying cement prior to filling the annular void space between the two with plastic refractory mix so that the sections are removable without breaking up the cast refractory material in disassembling. The void space between the outer refractory and the precast liner is filled thru openings in each of the vertical shell sections which extend thru the already cast refractory adjacent the shell.

It is not essential to use cement or sealer between the castable refractory and the precast liner as a seal is formed between these elements when the castable mix is cast against the liner. This seal is then broken when the furnace is fired to operating temperature and permits longitudinal movement of the liner with respect to the surrounding castable refractory.

It is not essential to construct sections 12 and 14 of furnace 10 in the form of half-cylinders. Section 12 may advantageously extend thru more than 180°, thereby leaving each of sections 16 less than 180° and reducing the size and weight of the vertical sections. These vertical sections may extend thru any convenient arc, such as 120 to 180°, which provides sufficient room to permit repair men to reach and repair any section of the interior requiring repair or replacement. Lower longitudinal section 12 may cover less than 180°, such as 150 to 170°, but less desirably in most applications of the invention.

In furnaces and reactors of the character described, particularly those utilized in carbon black production from oils, most of the breakdown of furnace structure is to the liner in the inlet end of the furnace and in the end section adjacent the effluent line. This simplifies repair in that removal of only one vertical end section is usually necessary to replacement of one or more precast refractory sections. Where the required repair is under a vertical section adjacent either end section, removal of this section and the adjacent end section permits sliding out of damaged or worn out liner sections thru the end of the furnace and sliding in of new sections as required. In any instance, the castable refractory insulation comes out intact with the shell section and is ready for replacement as soon as the repair or replacement of liner sections is effected. In this manner, loss of time for curing castable refractory is avoided and a considerable saving in expensive materials is made. In addition, less time is required for the actual dismantling and reassembling.

The furnace described is particularly adapted to the production of carbon black from oils having a high ration of C to H. In some furnaces adapted to this use, the combustion section at the inlet end of the furnace is appreciably larger in diameter than the other sections of the furnace as more fully disclosed in the copending application of C. H. Edwards, Jr., and T. S. Whitsel, Jr., Serial No. 421,762, filed April 8, 1954, now U.S. Patent No. 2,791,728. When constructing a furnace with an enlarged combustion section at the inlet end of the furnace, the enlarged section may be built in accordance with the construction disclosed herein or it may be constructed by any other suitable method and attached to the end of a furnace such as that shown in Figure 1, of course, omitting end plate 20 and feed inlet conduits 28.

Although this process has been described and exemplified in terms of its preferred modifications, it is understood that various changes may be made without departing from the spirit and scope of the disclosure and of the claims.

I claim:

1. A high temperature reactor comprising a cylindrical shell formed of two longitudinal sections each extending from end to end of said shell attached by readily separable joints, one of said longitudinal sections being formed of a plurality of transverse sections attached by readily separable joints along a circumference of said shell; a thick refractory layer of insulating material bonded to the inside surface of said shell, said layer being made in sections to correspond to aforesaid longitudinal and transverse sections to permit removing said transverse sections independently of each other for repair of the furnace; an inner precast refractory liner loosely fitting and unbonded to said refractory layer; and sealing means in said joints to provide a gas tight seal.

2. The reactor of claim 1 wherein said cylindrical shell is disposed with its axis horizontal so that the joints between said longitudinal sections are in a substantially horizontal plane and said transverse sections are in the upper longitudinal section.

3. The reactor of claim 2 including anchoring elements fixed to said shell and extending into the refractory layer of each transverse section only partially thru said layer so as to facilitate removal of each section of refractory layer with its corresponding shell section.

4. The reactor of claim 1 wherein each of said longitudinal shell sections comprises one-half of said shell.

5. The reactor of claim 1 wherein said precast liner is constructed of precast sections jointed by means of lapped joints and with non-vitrifying cement.

References Cited in the file of this patent

UNITED STATES PATENTS

| | | |
|---|---|---|
| 1,570,617 | Copeman | Jan. 26, 1926 |
| 2,417,348 | Carter | Mar. 11, 1947 |
| 2,482,618 | Hosbein | Sept. 20, 1949 |
| 2,563,908 | Bastress et al. | Aug. 14, 1951 |
| 2,705,414 | Rose | Apr. 5, 1955 |
| 2,731,466 | Heffner | Jan. 17, 1956 |